United States Patent [19]

Houghton et al.

[11] 4,441,783

[45] Apr. 10, 1984

[54] VESSEL NAVIGATION LIGHTS

[75] Inventors: Alexander J. Houghton, Annandale; Thomas M. Knasel, McLean, both of Va.

[73] Assignee: Science Applications, Inc., La Jolla, Calif.

[21] Appl. No.: 421,915

[22] Filed: Sep. 23, 1982

Related U.S. Application Data

[62] Division of Ser. No. 149,962, May 15, 1980, Pat. No. 4,367,519.

[51] Int. Cl.³ .......................... G02B 5/14; F21V 7/00

[52] U.S. Cl. ................................ 350/96.10; 362/297; 362/298; 362/300; 350/293

[58] Field of Search ............... 350/96.10, 96.15, 96.18, 350/96.28, 420, 444, 293, 296; 362/32, 296, 297, 298, 300, 307, 310

[56] References Cited

U.S. PATENT DOCUMENTS

| | | | |
|---|---|---|---|
| 3,676,667 | 7/1972 | Malifaud | 362/310 |
| 4,003,638 | 1/1977 | Winston | 350/293 |
| 4,029,519 | 6/1977 | Schertz et al. | 350/96.10 |
| 4,114,592 | 9/1978 | Winston | 350/96.10 |
| 4,129,372 | 12/1978 | Allgeier | 350/96.1 X |
| 4,175,244 | 11/1979 | Klein et al. | 313/315 |
| 4,219,871 | 8/1980 | Larrimore | 362/264 |
| 4,240,692 | 12/1980 | Winston | 350/96.10 |
| 4,293,901 | 10/1981 | Hernandez | 362/307 |
| 4,305,640 | 12/1981 | Cullis et al. | 350/96.10 |

FOREIGN PATENT DOCUMENTS

| | | | |
|---|---|---|---|
| 1472267 | 12/1969 | Fed. Rep. of Germany . | |
| 2240780 | 2/1974 | Fed. Rep. of Germany | 362/32 |
| 1936715 | 8/1979 | Fed. Rep. of Germany | 350/96.10 |

OTHER PUBLICATIONS

Winston, *Applied Optics*, vol. 15, No. 2, Feb. 1976, "Dielectric Compound Parabolic Concentrators," pp. 291–292.

Rabl, *Solar Energy*, vol. 19, 1977, "Prisms with Total Internal Reflection as Solar Reflectors," pp. 555–565.

Goodman et al., *Applied Optics*, vol. 15, No. 10, Oct. 1976, "Solid Dielectric Compound Paraabolic Concentrators: on . . . ," pp. 2434–2436.

*Primary Examiner*—John D. Lee
*Assistant Examiner*—Frank Gonzâlez
*Attorney, Agent, or Firm*—Bruno J. Verbeck; Michael L. Slonecker

[57] ABSTRACT

Optical elements for vessel navigation lights, providing improved and inexpensive means for achieving uniform, luminous intensity over a sharply bounded horizontal arc of visibility, and also for achieving a desired vertical arc of visibility, comprise means for projecting light from a diffuse source or an array or mosaic of point sources into a field the horizontal and vertical arcs of which can be precisely defined. The disclosure encompasses two geometric configurations for projecting light, symmetrical and asymmetrical, compound parabolic concentrators, each of which may be constructed as either a reflective cavity or a refractive dielectric, thereby to provide four basic designs for achieving uniform illumination over various horizontal arcs of visibility. In addition, the disclosure encompasses three modes of diffuse light projection to achieve uniform illumination over various vertical arcs of visibility. Due to the precision of the results obtained, the optical elements provide navigation lights fully in compliance with the rigid specifications for arcs of visibility set forth in the Final Act of the International Conference on Revision of the International Regulations for Preventing Collisions at Sea, 1972 (72 COLREGS) and the International Rules of Navigation Act of 1977, 33 U.S.C. 1601, and do so with particular economy.

5 Claims, 27 Drawing Figures

VESSEL NAVIGATION LIGHTS

CROSS REFERENCE

This application is a division of application Ser. No. 149,962, filed May 15, 1980, now U.S. Pat. No. 4,367,519.

The subject matter of this application is disclosed in Disclosure Document No. 076259, filed Dec. 4, 1978, by the instant applicants.

BACKGROUND OF THE INVENTION

The importance of proper running and riding lights on vessels using public navigable waters cannot be over emphasized. During the hours of darkness, it is the function of these lights in clear weather to give such timely and effective notice to one vessel of the proximity of another that all doubt as to her character and intentions will be satisfactorily settled before there is any serious risk of collision. Even in thick fog, with the mariners' safety in an approaching situation dependent upon sound rather than upon sight, it is often the glimmer of these same lights through the haze that finally enables each fog enshrouded vessel safely to feel her way past the other. The definitions for proper lights are set forth in the Final Act of the International Conference on Revision of the International Regulations for Preventing Collisions at Sea, 1972, (72 COLREGS), the International Rules of Navigation Act of 1977 (33 U.S.C. 1601), and the Inland Rules. It is significant that 16 of the 38 International Rules and 16 of the 32 Inland Rules relate wholely or in part to lights. In cases of collision, the courts are as certain to hold a vessel at fault for improper lights as for a violation of signal requirements or for failure to maintain a proper lookout.

It is evident from the case law that mere volume of light, even for a vessel at anchor on a clear night, does not constitute the due notice to which approaching vessels are entitled or satisfy the requirement for regulation of lights.

The importance of having lights conform to the specific regulations has been brought out in a number of cases in which incorrect lights, though visible, proved misleading to approaching vessels. Strict compliance with the regulations is thus required.

By way of example, the regulations for starboard side lights as set forth in Article 2, International Rules, read as follows:

> "On the starboard side a green light so constructed as to show an unbroken light over an arc of the horizon of 112½ degrees (10 points of the compass) so fixed as to throw the light from right ahead to 22½ degrees (2 points) abaft the beam on the starboard side, and of such a character as to be visible at a distance of at least 2 miles."

The regulations for side and stern lights promulgated in the '72 COLREGS are in much greater detail and are defined in Rules 20 through 31, inclusive, and in Annex 1, paragraphs 2 through 5 and 7 through 13.

Heretofore all known navigational lights required to have horizontal arcs of visibility of less than 360°, as above set forth for side lights, achieved these arcs by the use of screens or equivalent opaque obstructions which blocked the light from the sectors outside of the desired arcs of visibility. The sharpness of the limiting boundaries were a function of the size of the light source, the distance from the source to the screen, and the length of the screen. Since the light source has finite size, achievement of a sharp cutoff is not possible. Very long screens, on the order of several feet, are satisfactory for meeting legal definitions of "proper lights," but are not suitable for small vessels. On small vessels, screens, if they are used at all, are too short to be effective. Consequently, small vessel lights have traditionally had only vaguely defined arcs and ranges of visibility.

The 1972 International Regulations, 72 COLREGS, have now established precise requirements for navigation lights with respect to (a) range of visibility, (b) arcs of visibility and (c) chromaticity. The net result is a very difficult design requirement for small vessel lights.

The U.S. boating industry has vigorously opposed ratification of the 72 COLREGS on the basis that compliance by small boats is technically and economically infeasible. Nevertheless, Congress passed the International Rules of Navigation Act of 1977 (33 U.S.C. 1601) which, among other things, provides civil penalties against operators of vessels not in compliance with the 72 COLREGS. In compliance with the Act, the U.S. Coast Guard has promulgated proposed rules for navigation lights for vessels under 20 meters in length (Federal Register, Sept. 7, 1978), which provide for testing and certification of navigation lights, and require that lights installed after Aug. 1, 1981 have USCG certification.

Several foreign manufacturers have produced lights which purport to meet the 72 COLREGS. These lights use high intensity point or line filaments, are rather large, and are expensive, both in initial cost and cost of operation. In these lights, the typical lamp consumes 25 watts (2 amperes per lamp in a 12 volt system). As a consequence, the burning of port, starboard and stern lights for 12 hours will draw 72 ampere hours from the vessel battery. This is an intolerable battery drain for a sailboat and would typically require two hours of engine time per day to restore the battery.

The increase in wattage is due to the requirement for increased visibility. High power is needed because the point or line source and screen geometry provide no optical gain. In an effort to achieve relatively small cutoff angles of visibility, only the light radiating directly from the filament is used, giving an optical gain of unity. Also, high power is required due to the chromaticity specifications which require more narrow band pass regions in the filters for colored lights. Also, due to the power requirements, lamp service life is rather short, and lamp replacement costs are high.

Despite the efforts put into the design of these new lights, and the expense thereof, the improved lights still do not fully comply with the 72 COLREGS because of the difficulty in mounting and/or maintaining the vertical light filament in a precise location relative to the vessel and because the light source, no matter how slim, has finite size and thus (like other prior art running lights) an inherent visibility cutoff angle of several degrees which prohibits attainment of the precise angles of visibility required by the COLREGS.

It is for these reasons, among others, that the boating industry has stated that it is technically and economically impossible for small vessels to comply with the new regulations.

SUMMARY OF THE INVENTION

An object of the present invention is to provide a family of optical elements facilitating the manufacture of navigational lights having precise arcs of visibility and suitable for vessels of all sizes, and particularly, though not exclusively, for smaller vessels, as well as lights for aircraft runways.

The invention uses the optical principle of light collimation (reflection or refraction) to achieve sharp cut-offs. The input to the diverger can be a diffuse light source or an array or mosaic of individual light sources, having sufficient luminosity to meet the minimum requirements for luminous intensity. Shape of the source, and the configuration of the optics will control the size and shape of the illuminated field.

The invention resides in part in the design and innovative application of a family of devices originally called FOCONS or ILCs (ideal light collectors) and now more generally referred to as CPCs (compound parabolic concentrators). They were first described by V. K. Baranov and G. K. Melnikov (Soviet Journal of Optical TEchnology, September-October 1966) H. Hintenberger and R. Winston (Review of Scientific Instruments, Vol. 37, No. 8, August 1966), and M. Ploke (Lichtfuhrungseinrichtungen mit Starker Konzentrationswirkung, Optik 25, Heft 1, 1969) A recent book, *The Optics of Nonimaging Concentrators,* by W. T. Welford and R. Winston, Academic Press, 1978, encompases most of the currently available technical data on the subject of CPC design.

The present invention utilizes a theoretical reciprocal of CPC technology to achieve the particular objects of the invention. Specifically, if the light exit plane of a CPC is used as a light entry plane for diffuse light and the light entry plane of the CPC is used as light exit plane, then the diffuse light introduced into the light entry plane (the CPC exit plane) will be projected into a field accurately defined by the light source and the CPC geometry. The inverted CPC thus becomes a precision diverger for the angular projection of light.

This invention encompasses two geometrical configurations, a symmetrical and a asymmetrical diverger, each of which may be constructed as a cavity or a dielectric. This results in four basic designs for achieving the desired horizontal arcs of visilibity for the side lights, and two for the stern light (there being no apparent advantage to the use of the asymmetrical diverger for the stern light). In addition, three means for projecting light into desired vertical arcs of visibility are described.

The asymmetrical diverger geometry described herein does not appear in the published literature. However, ray tracing and experimental data establish that the same behaves in much the same manner as a symmetrical collimator for purposes of the present invention.

Due to the technology applied, optical gains can be achieved in the order of from about three times to about ten times the input energy (ignoring reflective losses) depending upon the means used to control the vertical arcs of visibility. Substantially any light source that is inexpensive to purchase, economical to operate, and readily available, even an oil or kerosene latern, may be employed in precision navigational lights.

By virtue of the optical elements provided by the present invention. navigational lights can now be designed and produced which are (1) in precise compliance with the 72 COLREGS and the implementing U.S. Statute 33 U.S.C. 1601; (2) capable of being manufactured in such small sizes as to be ideally suited to small vessels without need for elongated screens; (3) far less costly than prior art lights in terms of both initial investments and cost of operation, especially in comparison to the lights purportedly designed to comply with the COLREGS: and (4) powered by an inexpensive and readily available light source.

Other objects and advantages of the invention will become apparent from the following detailed description taken in conjunction with the accompanying drawings.

DETAILED DESCRIPTION OF THE PREFERRED EMBODIMENT

Figure 1:
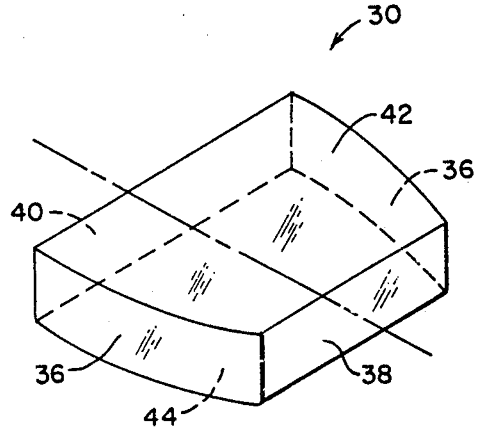
FIG. 1 is an isometric view of one embodiment of the optical elements of the invention in the form of a symmetrical cavity diverger.

In the accompanying drawings, FIGS. 1 through 12 are concerned with the divergence of light within selected or prescribed horizontal arcs of visibility, and FIGS. 13 through 20 are concerned with the divergence of light within vertical arcs of visibility.

Basically, four devices are described, each consisting of an optical element to be supplied with luminous energy from any convenient, economical, readily available source (hereinafter referred to as a "lamp") and to emit light through a lens or filter which may be colored or clear, over a precise angle of visibility, thereby to facilitate the manufacture of navigational lights fully satisfying all applicable laws and regulations.

The four basic devices are (1) a symmetrical cavity diverger, (2) a symmetrical dielectric diverger, (3) an asymmetrical cavity diverger, and (4) an asymmetrical dielectric diverger.

In the following description of the application of each of these optical elements to define precise horizontal arcs of visibility, two internationally prescribed arcs are of concern. However, the design equations are applicable to any arc of visibility less than 180°. The arcs of concern are 112.5° for the port and starboard running lights (side lights) and 135° for the stern light (and certain towing lights). The masthead light arc of visibility is specified at 225°, and it is provided by the combination of two side lights without colored filters.

In practice, to provide installation tolerances, the design arc for the side lights must be somewhat greater than 112.5° and that of the stern light somewhat greater than 135° to be in literal compliance with the 72 COLREGS. The selection of the actual arc to be used is left to the manufacturer. For purposes of illustration, the side light diverger diagrams referred to throughout this description are drawn to an arc of visibility of 2 radians (114.59°) for the starboard running light of a vessel. The collimators for the port running light are merely of opposite hand. The equations for the geometry of the stern light are identical except for the angle.

THE HORIZONTAL ARC OF VISIBILITY SYMMETRICAL CAVITY DIVERGER

Figure 2:
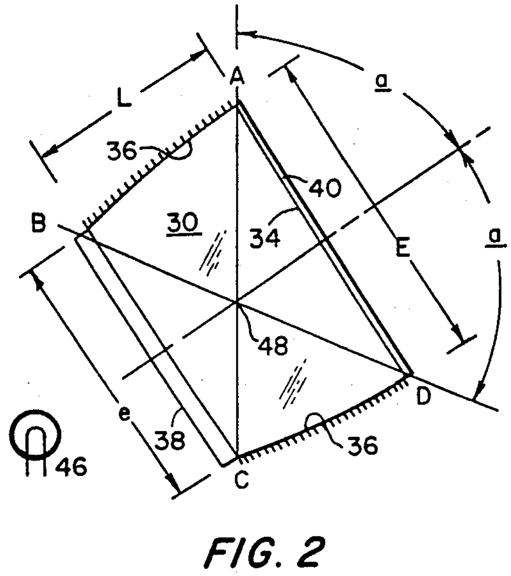
FIG. 2 is a plan view of the embodiment of the invention shown in FIG. 1, as laid out for a starboard running light for a vessel.

FIGS. 1 and 2 illustrate the cavity version of the symmetrical diverger for providing a horizontal arc of visibility equal to two radians. In FIG. 2, a is an angle equal to one-half of the desired horizontal arc of visibility, i.e., one radian in this illustration. As shown, the optical element comprises a hollow cavity 30 bounded by a light entry plane 32, a light exit plane 34, and parabolic sides 36. A light diffusing element 38 is placed over or forms the light entry plane, and a transparent cover or lens 40 is placed across or forms the light exit plane. The two planes are disposed in spaced parallel relation to one another along a common axis, herein referred to as the diverger axis. Top and bottom cover elements 42 and 44 complete the physical assembly of the element. Luminous energy for the element is provided by a lamp 46, which is here shown as being spaced axially from the light entry plane 32, although exact placement is not important.

The geometric construction of the element is as follows: Let E (the width of the light exit plane) equal 1 unit; then e (the width of the light entry plane) is equal to sin a; and, L (the distance between the entry and exit planes) is equal to $(E+e)/(2 \tan a)$.

The parabolic side walls AB and DC have the following geometry: parabola AB has its focus at C and its axis (which passes through C) parallel to the line BD. It has a focal length equal to $$e/2(1+\sin a)$$

Parabola DC is the same except that its focus is at B, and its axis is parallel to the line AC.

The inner surfaces of the parabolic side walls 36 are coated with a good quality specularly reflective material, such as silver or aluminum.

The light entering the cavity 30 from lamp 46 through the diffuser 38 will leave the light exit plane 34 and front cover 40 between the angles of plus and minus a with respect to the diverger axis, i.e., a total angle or arc equal to 2a. If the light entering is diffuse, the luminous intensity across the entire arc 2a of visibility will be uniform.

Figure 13:
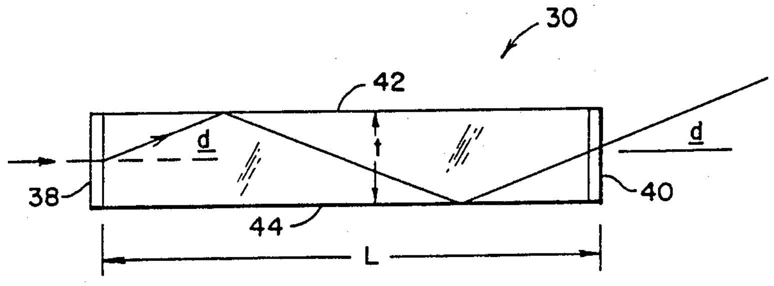
FIG. 13 is a diagrammatic illustration of the vertical arc of visibility for a cavity diverger having parallel top and bottom surfaces.
Figure 16:
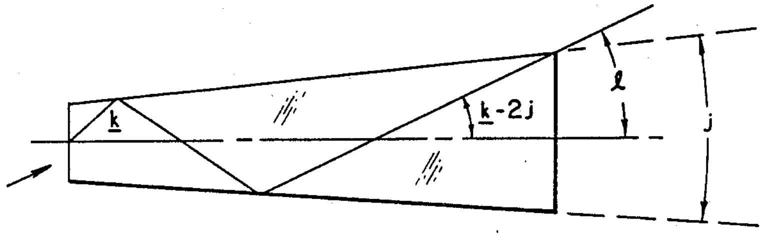
FIG. 16 is a diagrammatic illustration of the vertical arc of visibility for divergers having divergent top and bottom surfaces.
Figure 20:
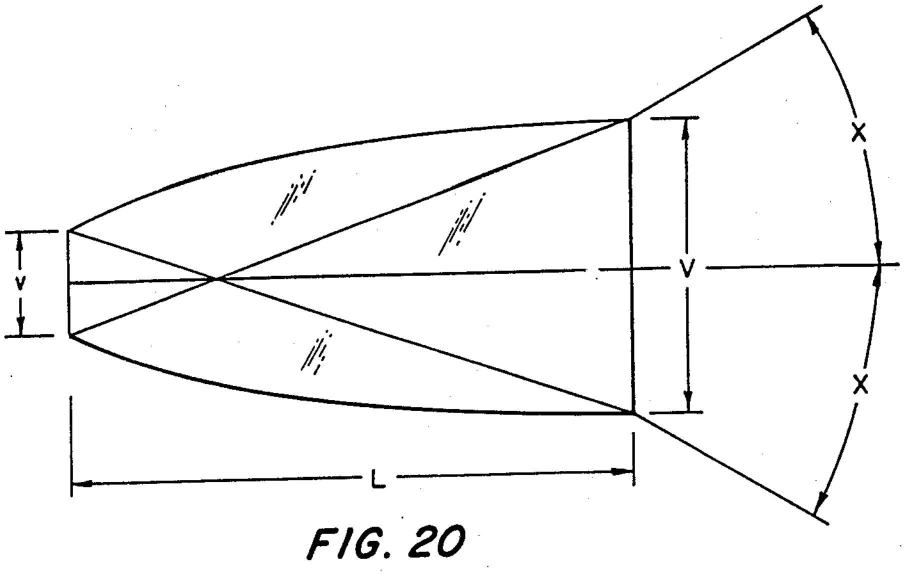
FIG. 20 is a side elevation of a symmetrical dielectric diverger for use in projecting light over a precise vertical arc of visibility.

The cavity 30 may be of arbitrary height or thickness, but its top and bottom surfaces, i.e., the interior surfaces of the covers 42 and 44 are coated with a specularly reflective material. In the simplest form of the cavity diverger the top and bottom covers 42 and 44 comprise parallel planes, as shown in FIG. 13, but the same may also comprise divergent planes as shown in FIG. 16 or parabolic walls as shown in FIG. 20.

The entire cavity is sealed to prevent deterioration of the reflective surfaces.

The virtual source of light, as viewed from any point in the arc of visibility, is a perpendicular line through the intersection of the two diagonals AC and BD, as indicated at point 48. Consequently, the cut-off angles at the two ends of the arc of visibility will be essentially zero.

THE HORIZONTAL ARC OF VISIBILITY SYMMETRICAL DIELECTRIC DIVERGER

Figure 3:
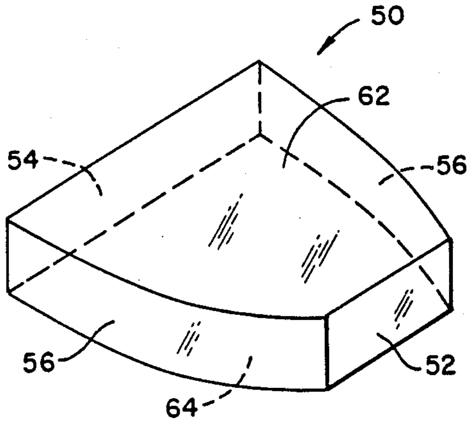
FIG. 3 is an isometric view of a second embodiment of the optical elements of the invention in the form of a symmetrical dielectric diverger.
Figure 4:
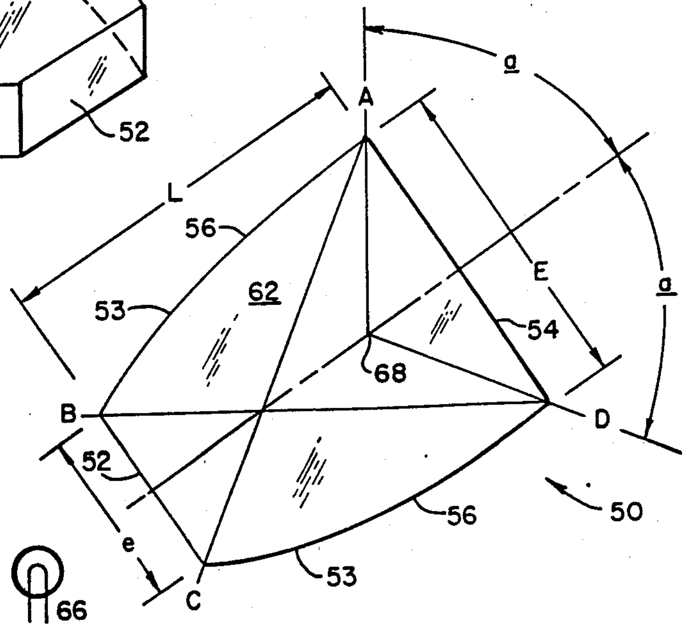
FIG. 4 is a plan view of the embodiment of the invention shown in FIG. 2, as laid out for a starboard running light for a vessel.

FIGS. 3 and 4 illustrate the dielectric version of the symmetrical diverger for providing a horizontal arc of visibility equal to two radians. The optical element comprises an integral, solid piece or block of transparent, light refractive, dielectric material 50 such as glass or plastic. The external configuration of the block 50 of dielectric material is generally similar to the external configuration of the above-described symmetrical cavity dirverger the same having external surfaces defining a light entry plane 52, a light exit plane 54, parabolic sides 56 and top and bottom walls or surfaces 62 and 64.

The design equations to define the boundaries of the dielectric are identical to those of the symmetrical cavity diverger of FIGS. 1 and 2, except that the angle a is defined by the equation $$\sin^{-1}\frac{[\text{SIN OF } \tfrac{1}{2} \text{ ANGLE OF ARC OF VISIBILITY}]}{n}$$

where n is the refractive index of the dielectric material.

The surface of the dielectric comprising the light entry plane 52 is treated to comprise a light diffusing surface, for example, by grinding, frosting, or dimpling. Except for the portions 53 nearest the light entry plane 52, the surfaces of the side walls 56 and the top and bottom walls 62 and 64 of the dielectric need not be coated with specularly reflective material because the light striking these surfaces, for all angles of practical interest, will be reflected by total internal reflection in accordance with Snell's law. However, it is preferable to coat at least those portions of the walls between the light entry plane 52 and the approximate locations of the reference numerals 53. A light source or lamp 66 is located at or near the axis of the dielectric in spaced relation to the light diffusing surface of the entry plane 52.

All light entering the light entry plane 52 from the source 66 will leave the light exit plane 54 within the design arc of visibility, and the virtual course of that light, in the horizontal plane, will be a perpendicular line through point 68.

Figure 5:
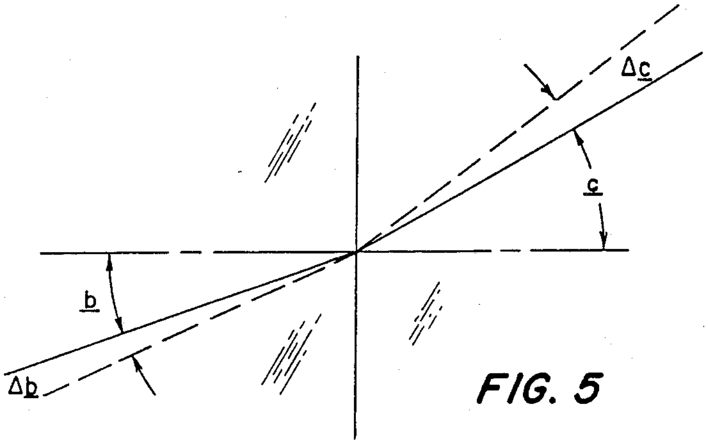
FIG. 5 is an illustration of the refraction of light at the exit plane of the symmetrical dielectric diverger shown in FIG. 4.

If the light on the dielectric side of the light entrance plane 52 is diffuse, the luminous intensity throughout the arc will be relatively uniform, but not as "flat" as that shown for the symmetrical cavity of FIGS. 1 and 2. This is caused by refraction at the light exit plane. FIG. 5 illustrates the phenomenon.

Light arriving at the exit plane at an angle b will be refracted to angle c upon leaving that plane. An increase in angle b (delta b) will cause a larger increase in angle c (delta c).

Since $$\sin c = n \sin b \quad \frac{dc}{db} = \frac{n \cos b}{\sqrt{1-(n \sin b)^2}},$$

and the relative intensity of the light within the arc of visibility will be cos b·db/dc. The factor cos b thus takes into account the intensity of the diffuse light which is proportionate thereto. To normalize this to the relative intensity on the axis, the factor must be divided by the intensity for b=0.

Figure 6:
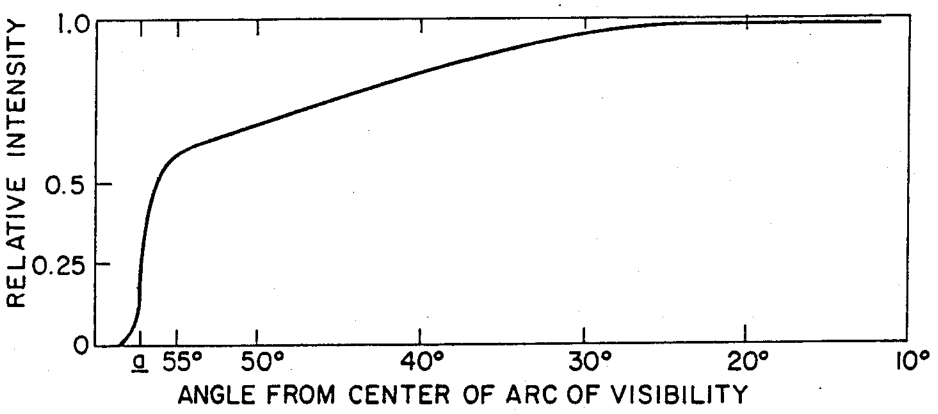
FIG. 6 is a graph illustrating the nonuniformity of the intensity of light at the exit plane of the dielectric diverger resulting from refraction.

The resultant relative intensity at the angle c is $\sqrt{1-(n \sin b)^2}$. A plot of this intensity, derived by ray tracing, vs the design arc of visibility is shown in FIG. 6. The net result is that the on-axis intensity must be about 1.75 times the minimum prescribed intensity to ensure compliance with the 72 COLREGS. However, the dielectric diverger is potentially simpler to manufacture than the cavity diverger and the increased luminosity requirement is partly offset by the perfect efficiency of the total internal reflection.

Figure 7:
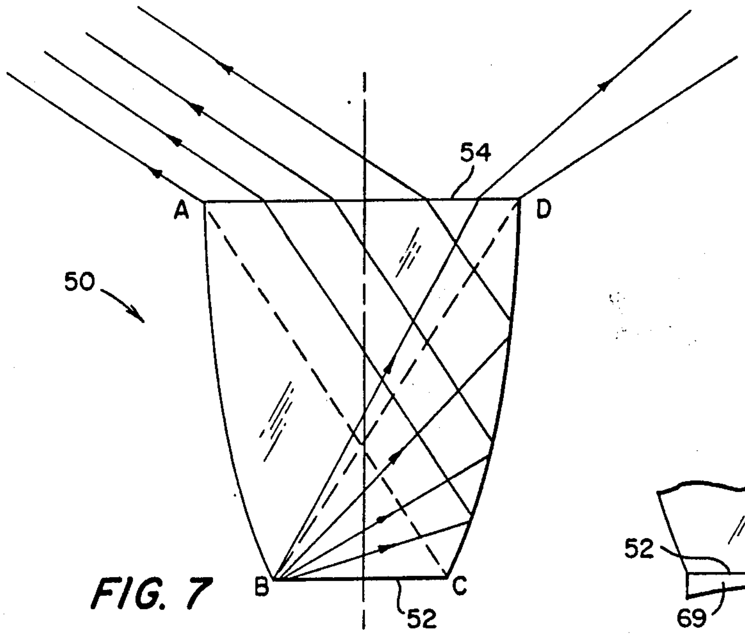
FIG. 7 is a plan view of the symmetrical dielectric diverger illustrating in greater detail the mode of light refraction at the exit plane thereof.
Figure 8:
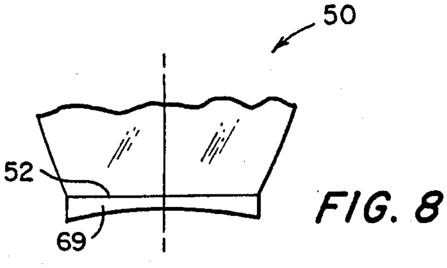
FIG. 8 is a fragmentary plan view of a modified embodiment of the symmetrical dielectric diverger of FIGS. 3 and 4 embodying one means for achieving greater uniformity of light intensity at the exit plane thereof.

Means to improve the uniformity of light intensity across the arc of visibility of the dielectric diverger are described in conjunction with FIGS. 7 and 8. As shown in FIG. 7, the light energy along the edges of the arc originates at the opposite corner of the diverger. Specifically, since CD is a parabola having its focus at B and its axis parallel to AC, the dominant source of light exiting at or near the limits of the light exit plane 54 emanates from the edges of the light entry plane 52. Consequently, the placement of a prism 69, which is plano-concave in horizontal cross-section, between the light source and the light diffusing surface of the light entry plane 52 will provide a compensating, non-uniform energy input distribution which will result in a more uniform output intensity distribution across the arc of visibility. The design of the plano-concave prism 69 will, of course, be influence by the light distribution on the exit plane 54, which results from direct illumination by the lamp 66 and the energy reflected by the walls of the housing (FIGS. 21–27) within which the lamp 66, the prism 69, and the light entry plane 52 are enclosed. The possible variations in lamp type, nominal lamp position, lamp housing shape, and the reflectivity of the lamp housing walls are nearly infinite, hence a generalized design rule is not possible. However, the principles involved as above described will enable those reasonably skilled in the art to design an appropriate prism 69 and/or lamp housing for each application contemplated.

THE ASYMMETRICAL CAVITY HORIZONTAL ARC DIVERGER

Figure 9:
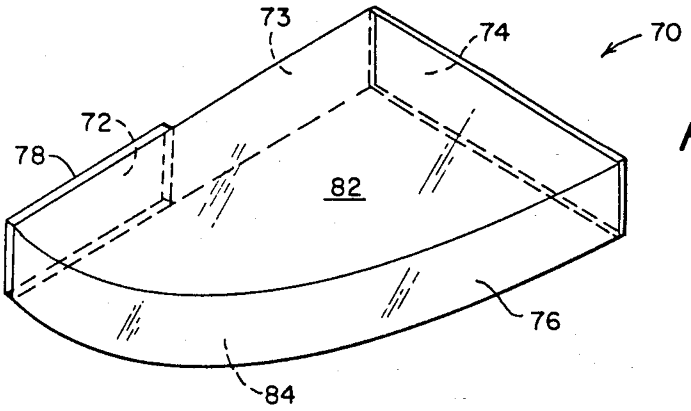
FIG. 9 is an isometric view of a fourth embodiment of the optical elements of the invention in the form of an asymmetrical cavity diverger for a starboard running light for a vessel.
Figure 10:
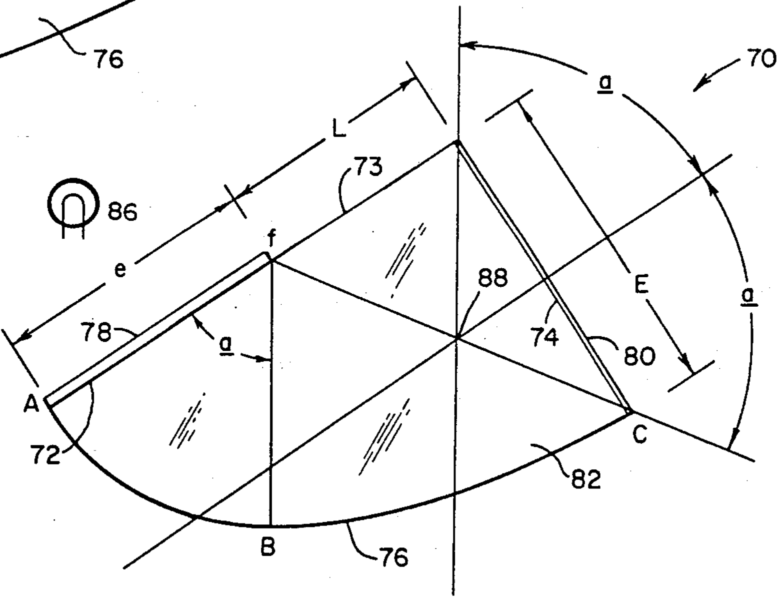
FIG. 10 is a plan view of the embodiment of the invention shwon in FIG. 9.

FIGS. 9 and 10 illustrate the asymmetrical cavity version of horizontal arc diverger of the invention. The asymmetrical diverger is a geometrical transform of the symmetrical diverger that has its light entry plane at right angles to the light exit plane. Its optical performance is identical to the symmetrical diverger.

As shown in FIGS. 9 and 10, the optical device comprises a hollow cavity 70 bounded by a light entry plane 72, a straight side wall 73 which is an extension of the light entry plane 72, a light exit plane 74, and a curved side wall 76. The light exit plane 74 forms a first planar surface, the light entry plane 72 and wall 73 form a second planar surface extending from one edge of and normal or perpendicular to said first planar surface with the light entry plane 72 remote from the light exit plane 72, and the curved side 76 is connected to and joins the distal edges of said first and second planar surfaces.

The light entry plane 72 is formed by or covered with a diffuser element 78, formed for example from frosted, ground, or dimpled glass or plastic, and the light exit plane is covered with or formed by a transparent glass or plastic lens 80. The cavity is sealed closed by top and bottom walls 82 and 84. The interior surfaces of the walls 73,76,82, and 84 are coated with a good quality specularly reflective material (e.g., silver or aluminum). The light source is mounted in spaced relation to the entry plane 72, e.g., at or in the indicated vicinity of the lamp 86.

With a being an angle equal to one-half of the desired arc of visibility, the construction is as follows: with E equal to 1 unit, then e=sin a, L=ctn a, and e and L form a continuous line normal to E. The curve of wall 76 from A to B is the arc of a circle having its center at f (the junction of e and L) and a radius equal to e. The curve of wall 76 from B to C is parabolic, having its focus at f, a focal length equal to e, and its axis congruent with the line fB.

The cavity may be of arbitrary height or thickness, and its top and bottom walls may be parallel or divergent or parabolic. Controlled vertical divergence may be obtained in an analogous manner to that obtained in the horizontal case by using appropriate parabolic sections. The entire cavity is sealed to prevent deterioration of the reflectige surfaces. The virtual source of light, as viewed from any point in the arc $2a$ of visibility, is a vertical line focused at point 88.

THE ASYMMETRICAL DIELECTRIC HORIZONTAL ARC DIRVERGER

Figure 11:
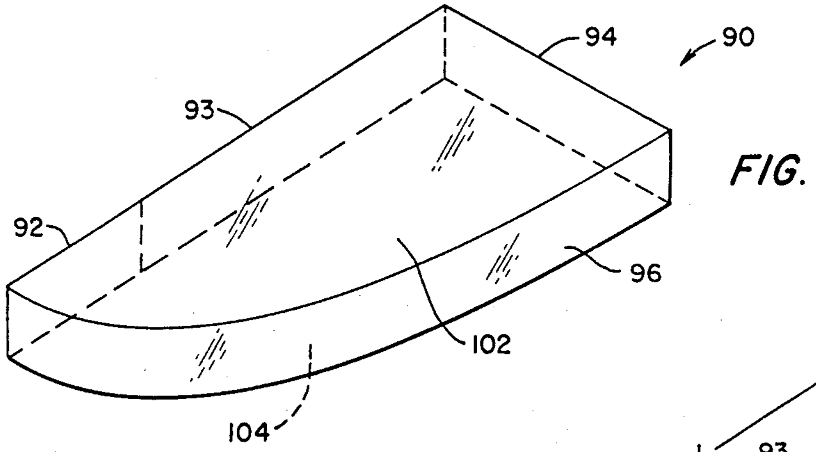
FIG. 11 is an isometric view of a fifth embodiment of the optical elements of the invention in the form of an asymmetrical dielectric diverger for a starboard running light for a vessel.
Figure 12:
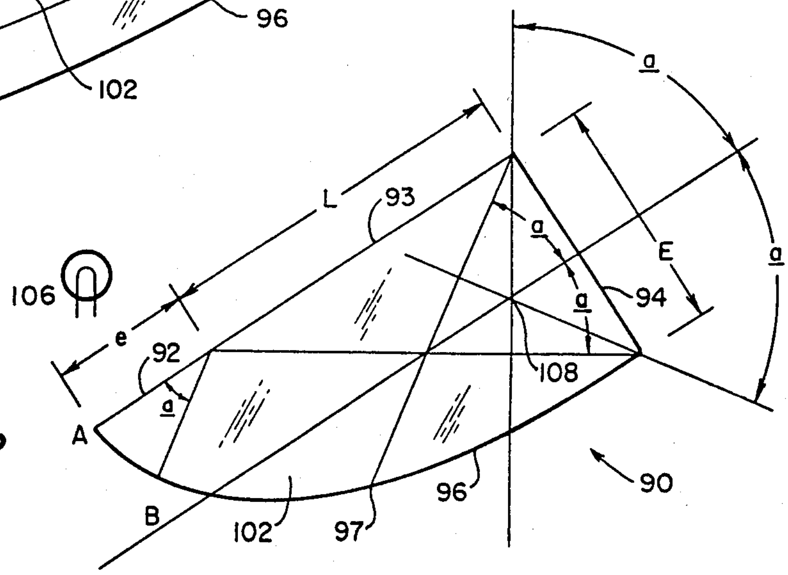
FIG. 12 is a plan view of the embodiment of the invention shown in FIG. 11.

FIGS. 11 and 12 show the dielectric version for asymmetrical collimation of light for a starboard running light with a two radian horizontal arc of visibility. The collimator is made of a solid piece or block of transparent light refractive dielectric material 90 (e.g. glass or plastic). The external configuration of the dielectric block 90 is generally similar to the external configuration of the asymmetrical cavity collimator 70 shown in FIGS. 9 and 10, the same having external surfaces defining a light entry plane 92, a straight side wall 93 comprising a continuation of the plane 92, a light exit plane 94, a curved side wall 96, and top and bottom walls 102 and 104.

The design equations to define the boundaries are identical to those for the asymmetrical cavity dirverger of FIGS. 9 and 10 except that the angle a is defined by $$\sin^{-1}\frac{[\text{SIN OF } \tfrac{1}{2} \text{ ANGLE OF ARC OF VISIBILITY}]}{n}$$

where n is the refractive index of the dielectric material.

The light entry plane 92 is treated, as by frosting, grinding, or dimpling, to comprise a light diffusing surface. The portion of the curved side wall 96 between point A and the point indicated at 97 is preferably coated with specularly reflective material. The remainder of the surfaces need not be coated because the light striking these surfaces, for all angles of practical interest, will be reflected by total internal reflection in accordance with Snell's law. The light source is at or near point 106. All light entering the light entry plane will leave the light exit plane within the design arc of visibility, and the virtual source of the light, in the horizontal plane, will be a perpendicular line through point 108.

As explained in connection with FIGS. 5 through 8, light arriving at the exit plane at an angle b will be refracted to the angle c upon leaving the plane. The spreading effect is identical to that described for the symmetrical dielectric diverger, and the luminous intensity across the arc of visibility will also be the same.

VERTICAL ARC OF VISIBILITY-PARALLEL TOP AND BOTTOM SURFACES

If any of the above-described dirvergers are made with parallel top and bottom surfaces, they will have inherently large vertical arcs of visibility.

FIG. 13 shows the path of a ray through a cavity-type dirverger. The relative intensity, at the light diffusing means (38 for example) in the vertical is proportionate to the cosine of angle d. The ray will be successively reflected from top and bottom (42 and 44) with no change in its angle from the horizontal axis until it finally leaves the light exit plane lens (40). The intensity at exit will be a function of angle d, the reflectivity of the top and bottom surfaces, and the ratio of t/L (which determines the number of reflections). The relative intensity I at any angle d is:

$$I(d) = \cos d \cdot R^{\frac{L \tan d}{t}}$$

where R is the reflectivity of the top and bottom surfaces, L is the length of the dirverger, and t is the thickness.

Figure 14:
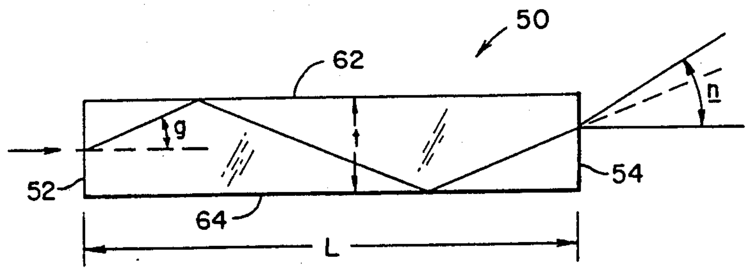
FIG. 14 is a diagrammatic illustration of the vertical arc of visibility for a dielectric diverger having parallel top and bottom surfaces.

FIG. 14 shows the same conditions within a dielectric collimator. There are two important differences: for angle g, up to the critical angle gc, the reflections are lossless, and refraction at the exit results in a vertical angle h, which is larger than g.

The most widely available materials for optical elements of this type (e.g., glass, acrylic, and polycarbonate) have indexes of refraction close to 1.5, hence the critical angle ($g_c$) is equal to $\sin^{-1} 1/1.5$ or 41.8°. The spreading loss previously described and illustrated in FIG. 5 applies in the vertical direction, hence the relative intensity in the vertical angle for a dielectric dirverger (the intensity at g=0 being taken as unity) is:

$$I(h) = \sqrt{1-(n \sin g)^2}$$

where h is the vertical angle past the exit and $h=\sin^{-1}(n \sin g)$.

Figure 15:
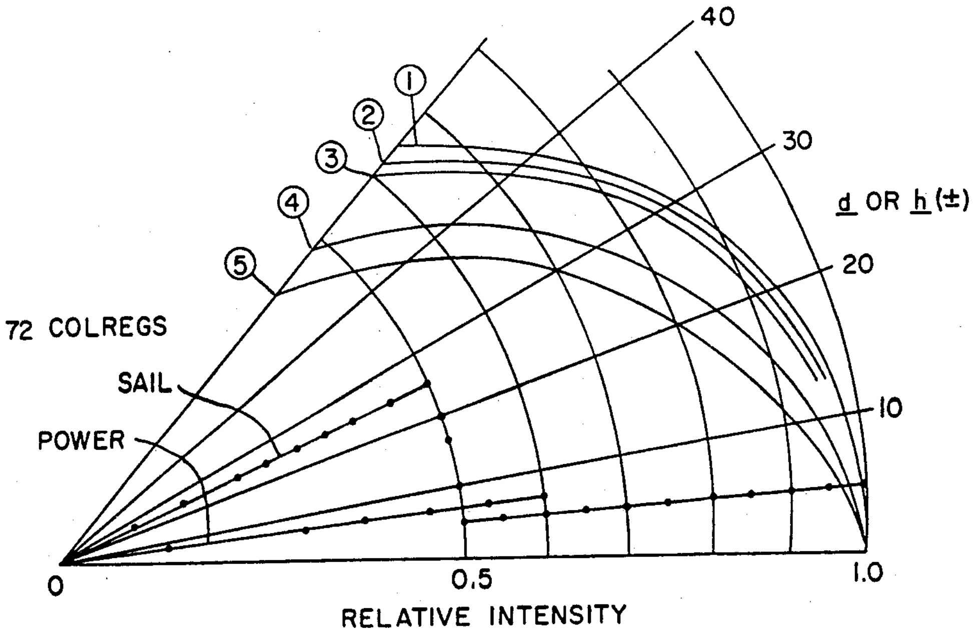
FIG. 15 is a graphic representation of the relative intensities of the vertical arcs of visibility of a dielectric diverger and four cavity divergers having parallel top and bottom surfaces, the graph also illustrating the minimum vertical angle requirements set forth in the 72 COLREGS.

FIG. 15 is a graphic illustration of the relative vertical intensities for five configurations as follows:

| Curve No. | Collimator Type | $\frac{t}{L}$ | Coating Reflectivity |
|---|---|---|---|
| 1 | Dielectric | Any | N/A |
| 2 | Cavity | 0.5 | .98 |
| 3 | Cavity | 0.5 | .87 |
| 4 | Cavity | 0.3 | .98 |
| 5 | Cavity | 0.3 | .87 |

Note that the vertical arcs of a dielectric are independent of t/L and coating reflectivity. The minimum vertical angle requirements set forth in the 72 COLREGS for both sail and power vessels under 20 meters are also shown in the graph. As illustrated, dirvergers made in accordance with the present invention exceed the minimum requirements.

VERTICAL ARC OF VISIBILITY-DIVERGENT TOP AND BOTTOM SURFACES

Large vertical angles of visibility are advantageous for sailboats which frequently operate for prolonged periods at angles of heel greater than the 25° minimum specified in the 72 COLREGS. However, it may be desirable to concentrate the light in a narrower vertical field to reduce lamp power requirements. This can be accomplished by making the top and bottom surfaces of the dirverger divergent, as shown in FIG. 16.

If the top and bottom surfaces diverge at an angle j, then the vertical angle of any ray will be reduced by j, for each reflection from the top or bottom. In FIG. 16, j is 10°. A ray from the light diffusing means (38) at vertical angle k will thus be reduced by 10° for each reflection. If the ray illustrated has an initial angle k of 45°, and is twice reflected, it will have an exit angle l, of k=2j or 25°.

Thus, by the proper selection of angle j, the vertical intensity can be shaped to suit the designer's objectives.

The use of divergent top and bottom surfaces is applicable to both the cavity and the dielectric dirvergers. However, to preserve the energy striking the top and bottom surfaces of a dielectric diverger at initial angles less than the critical angle, the top and bottom surfaces of the dielectric diverger should be coated with a specularly reflective material over about ½ their length at the end nearest the light entry plane.

Figure 17:
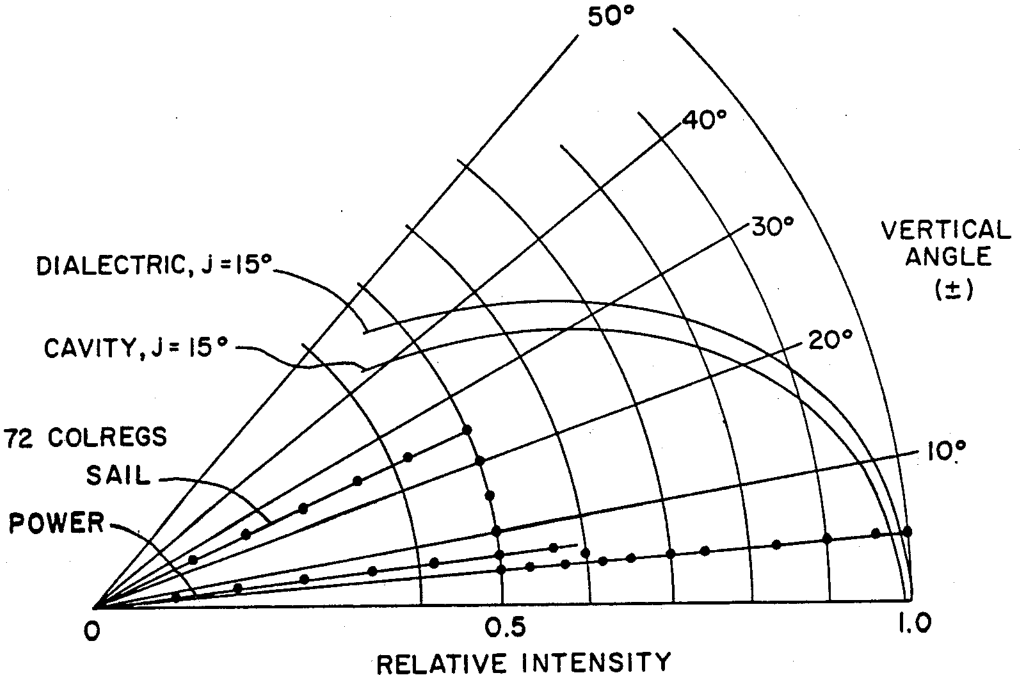
FIG. 17 is a graphic representation of the relative intensities of the vertical arcs of visibility of a dielectric diverger and a cavity diverger having divergent top and bottom surfaces, the graph also illustrating the minimum vertical angle requirements set forth in the 72 COLREGS.

A graphic illustration of the relative intensities of dielectric and cavity diverger having a 15° divergence, and comparison of the same to the 72 COLREGS minimum requirements, is set forth in FIG. 17.

Figure 18:
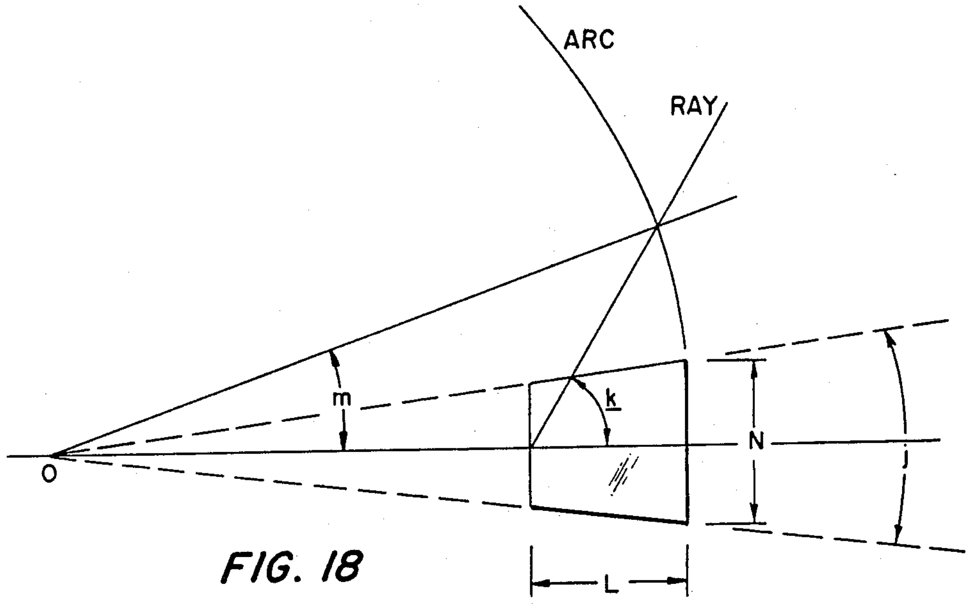
FIG. 18 is a graphic illustration of a method for determining the vertical arc of visibility for a symmetrical diverger having its top and bottom surfaces diverging at a selected angle.

While the use of divergent top and bottom surfaces is thus shown to be of particular value in practical application of the present invention, calculation of the effect of divergence is laborious. A simplified graphic approach to an adequate approximation of the solution is illustrated in FIG. 18, and described as follows:

STEP 1: Determine the dimension L, the length of the dirverger. Select the angle of divergence j. Select the dimension N, the height of the exit plane.

STEP 2: Construct a diagram as shown, with the horizontal axis through the center of the vertical cross-section of the dirverger, and with the lines extending from the top and bottom surfaces converging at point o.

STEP 3: Draw an arc having its center at point o and a radius that just cuts the outer limit of the dirverger cross-section.

STEP 4: For any ray at angle k from the horizontal line, draw a straight line from the center point of the entry plane to intersect the arc.

STEP 5: Measure the angle m between the horizontal axis and a line from point o to the intersection of the ray and the arc.

| FOR A CAVITY DIRVERGER | |
|---|---|
| EXIT ANGLE (l) | $k \leqq j/2,\ l = k$ |
| | $k > j/2,\ l = (k - m)$ |
| INTENSITY* (I) | $k \leqq j/2,\ I = \cos k$ |
| | $k > j/2,\ I = \cos k \cdot R^{m/j}$ where R is the reflectivity of the cavity |

FOR A DIELECTRIC-TYPE DIRVERGER:

EXIT ANGLE (l): $k \leqq j/2,\ l = \sin^{-1} n\sin k$ $k > j/2,\ l = \sin^{-1} n\sin(k - m)$

INTENSITY* (I):

$$k \leqq j/2,\ I = \sqrt{1 - (n\sin k)^2}$$

-continued

FOR A DIELECTRIC-TYPE DIRVERGER:

$$k > j/2,\ I = \frac{\cos k \sqrt{1 - [n\sin(k - m)^2]}}{\cos(k - m)}$$

*Intensity values are normalized to I(k = 0) = 1

VERTICAL ARC OF VISIBILITY-VERTICAL DIVERGER

Figure 19:
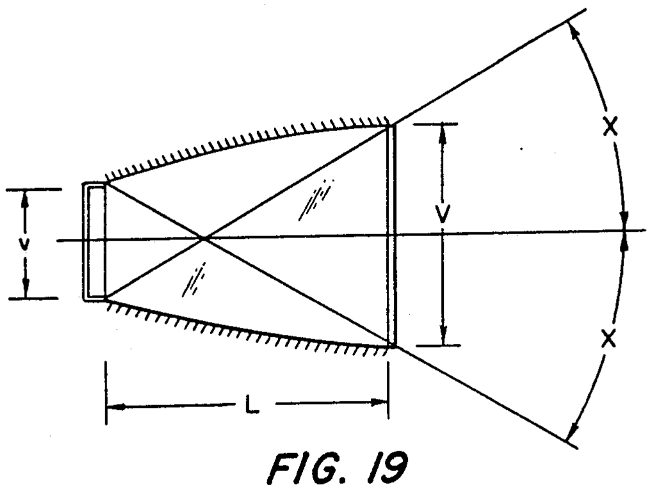
FIG. 19 is a side elevation of a symmetrical cavity diverger for use in projecting light over a precise vertical arc of visibility.

A third method for achieving controlled vertical divergence is to shape the vertical cross-section as a symmetrical diverger designed for the desired arc of visibility, as shown for a cavity dirverger in FIG. 19 and a dielectric collimator in FIG. 20. The design equations are identical to those for the symmetrical horizontal dirvergers described in connection with FIGS. 1 and 2 and FIGS. 3 and 4, respectively.

Each of the symmetrical divergers will provide a sharply defined vertical arc of visibility having essentially uniform luminous intensity over the entire arc. The "roll-off" in intensity for the dielectric version would be minor inasmuch as the angles involved are small.

Because the length of the dirverger is fixed by the initial selection of the horizontal arc criteria, i.e., the width of the light exit plane (E in FIGS. 2 and 4), and the desired horizontal arc of visibility (2a in the examples given), there are no design choices for vertical divergence except the desired vertical arc of visibility, i.e., 2x. This, in turn, fixes the height V of the light exit plane and the height v of the light entry plane.

Since in accordance with the earlier description $$L = \frac{E + e}{2 \tan a}$$

and E=1 unit and e=sin a, and since correspondingly $$L = \frac{V + v}{2 \tan x},$$

and v=V sin x, then $$\frac{1 + \sin a}{2 \tan a} = \frac{V(1 = \sin x)}{2 \tan x} \text{ and } V = \frac{(1 + \sin a) \tan x}{(1 + \sin x) \tan a}.$$

The following table gives values of V and v for selected vertical arcs of visibility for symmetrical cavity divergers and for symmetrical dielectric divergers having a refraction index of 1.5.

| Dimensions of v and V where E is Unity | | | | |
|---|---|---|---|---|
| | Cavity | | Dielectric | |
| x(±) | V | v | V | v |
| 7.5° | .138 | .018 | .185 | .016 |
| 10° | .178 | .031 | .241 | .028 |
| 25° | .388 | .164 | .525 | .149 |
| 30° | .455 | .228 | .611 | .204 |

It can been seen that the dimension v is relatively small for the narrower vertical arcs of visibility and would require great care in fabrication; however, those for ±25° or ±30° vertical arcs of visibility, which would be of principal use on sailboats, are of tractable size.

NAVIGATIONAL LIGHTS EMBODYING THE DIVERGERS

Construction of navigational lights using the divergers described requires:

a. Means for providing red or green coloration for the port and starboard side lights, respectively, and yellow for the 135° horizontal arc of visibility lights which are used as towing lights.
b. A housing which holds the collimator in proper alignment, provides a space for the lamp and its holder, and incorporates means for securing the light to the appropriate part of the vessel.

For cavity-type divergers, coloration may be provided by the use of an appropriate filter as the light exit plane cover or lens (40 or 80) or the light entry plane diffuser (38 or 78). In the dielectric diverger, the basic diverger can be made of the appropriate color or a thin colored filter can be coupled to the exit plane (54 or 94) of the dielectric material. While the use of a colored lamp would achieve the same result, this would require lamps of special manufacture and would invite error in lamp replacement. Thus, it is preferred to use a colored dielectric material or colored filters as described.

The housing of the light can be made of any material, including metal or opaque plastic. Basically, the housing can be a fairly simple enclosure, for enclosing the diverger and for defining a recess or space for reception of a lamp and its holder; the housing being provided with suitable means for gaining access to the lamp receiving space for installation, service, and replacement of the lamp. The interior surfaces of the walls defining the lamp receiving space should be coated with a durable, flat, diffuse white coating to maximize the efficiency of the fixture. Alternatively, a specular reflector may be used to direct all available light onto the light entry plane of the diverger. However, the best uniformities over the arcs of visibility will be obtained when the light entry plane is uniformly illuminated with diffuse light. The lamp need have no special characteristics, nor is its exact placement of great importance.

Representative examples of navigational lights embodying the described optical elements and the described housing criteria are shown in FIGS. 21 through 27.

Figure 21:
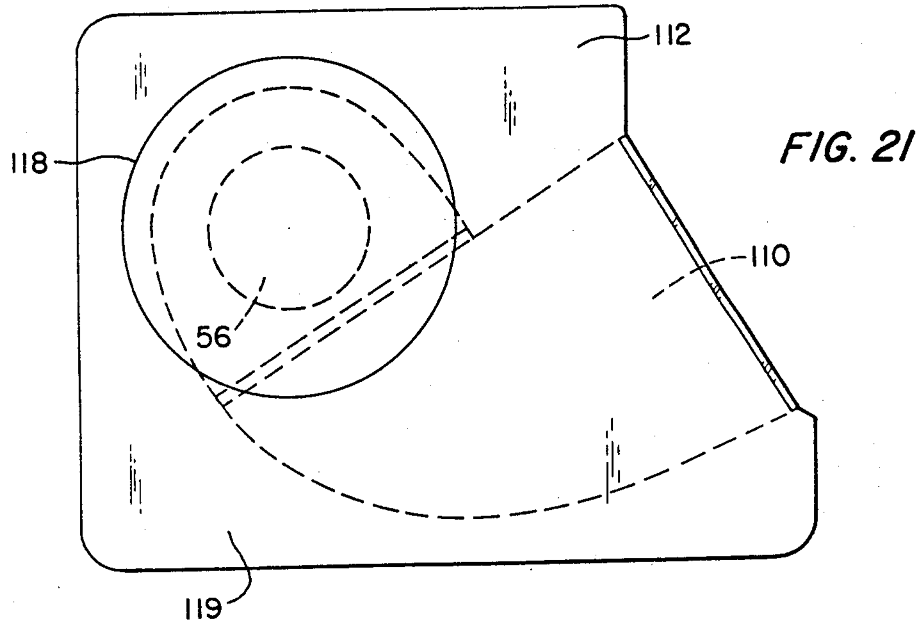
FIG. 21 is a plan view of a starboard running light for vessels provided in accordance with the invention and utilizing an asymmetrical diverger.
Figure 22:
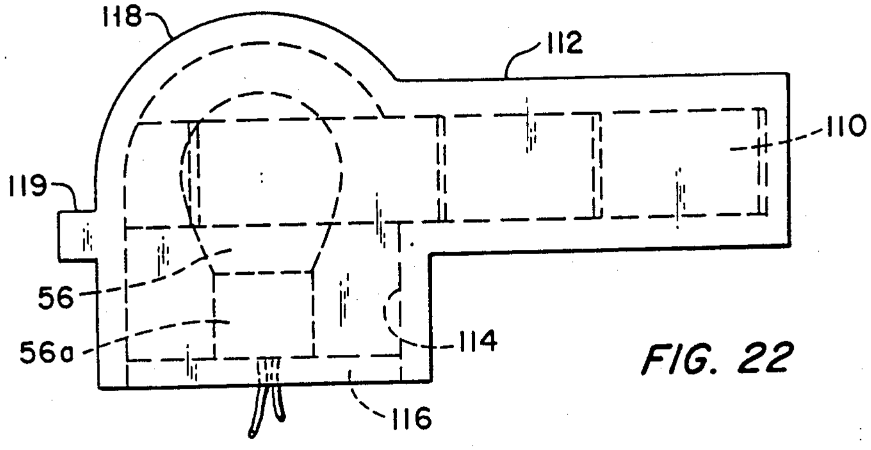
FIG. 22 is a side view of the navigational light shown in FIG. 21.

Referring to FIGS. 21 and 22, a starboard running light is shown as comprising an asymmetrical diverger 110 (which may be the same as any of the asymmetrical divergers previously described), a housing 112 fitted or molded about the diverger and having a lamp receiving space or recess 114 shaped and dimensioned to receive the selected light source or lamp, a removable closure element 116 for closing said recess, and a lamp 56 and lamp socket **56*a* mounted on the removable closure for insertion in and removal from the housing to facilitate bulb replacement. Alternatively, the dome 118 enclosing the top of the lamp housing could be made removable for gaining access to the lamp. In this embodiment, the housing 112 includes a peripheral flange 119** to facilitate mounting of the light on a vessel.

Figure 23:
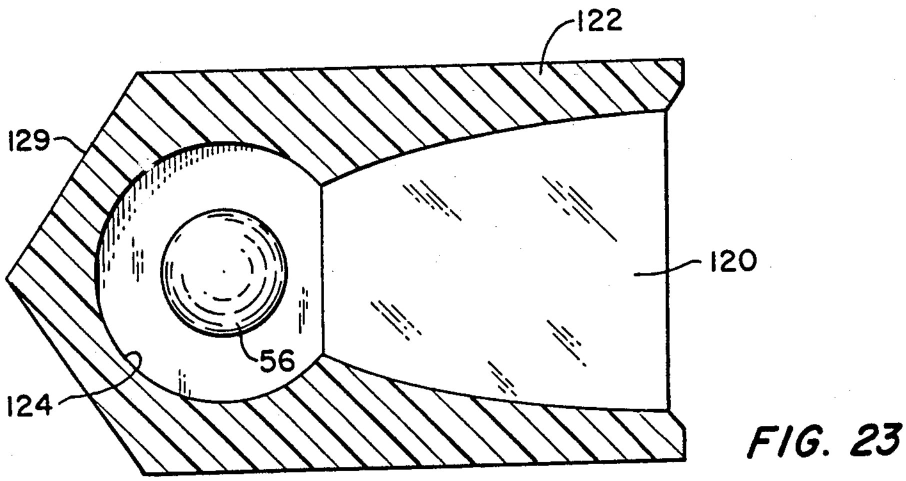
FIG. 23 is a horizontal, longitudinal sectional view of a starboard running light utilizing a symmetrical diverger.

FIG. 23 shows a starboard running light comprising a symmetrical diverger 120, preferably a dielectric collimator, a housing 122, preferably a plastic housing molded directly around the diverger, and having a lamp recess 124 therein, and a lamp 56 removably mounted in the said recess or space. The housing 122 includes a mounting surface 129 parallel with the forward margin of the arc of visibility of the optical element 120 for mounting the light in proper position on a side bulkhead of a vessel. Alternatively, the housing could be provided with an integral mounting flange as in the embodiment of FIGS. 21 and 22, or the same could be mounted on an appropriate bracket.

Port running lights would be the same as the starboard running lights illustrated in FIGS. 21 through 23, but of opposite hand.

Figure 24:
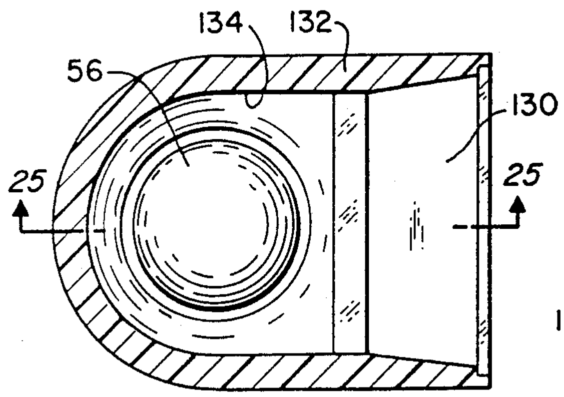
FIG. 24 is a horizontal sectional view of a stern light utilizing a symmetrical diverger.
Figure 25:
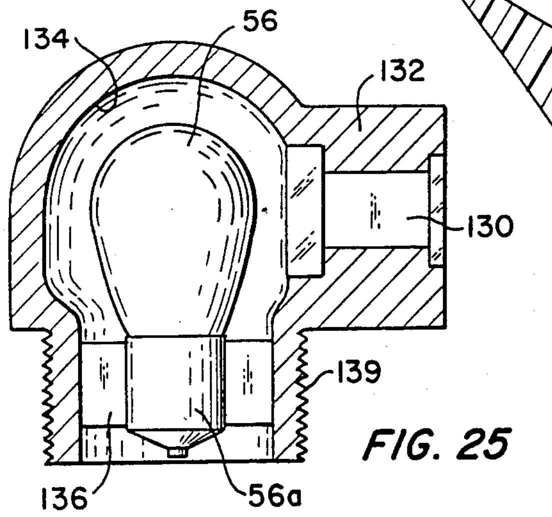
FIG. 25 is a vertical section of the navigational light shown in FIG. 24, the view being taken substantially on line 25—25 of FIG. 24.

A stern light for a vessel is shown in FIGS. 24 and 25 as comprising, by way of example, a symmetrical diverger 130, a lamp 56 and lamp socket **56*a* adjacent the entry plane of the dirverger, a housing 132 fitted or molded about the dirverger, and having therein a space or recess 134 for removable reception of the lamp and socket, and a spring type bracket 136 for removably mounting the lamp and socket in said recess. In this embodiment, the housing 132 is provided with a cylindrical threaded extension 139**, coaxial with the lamp recess, for mounting the light on a vessel.

Figure 26:
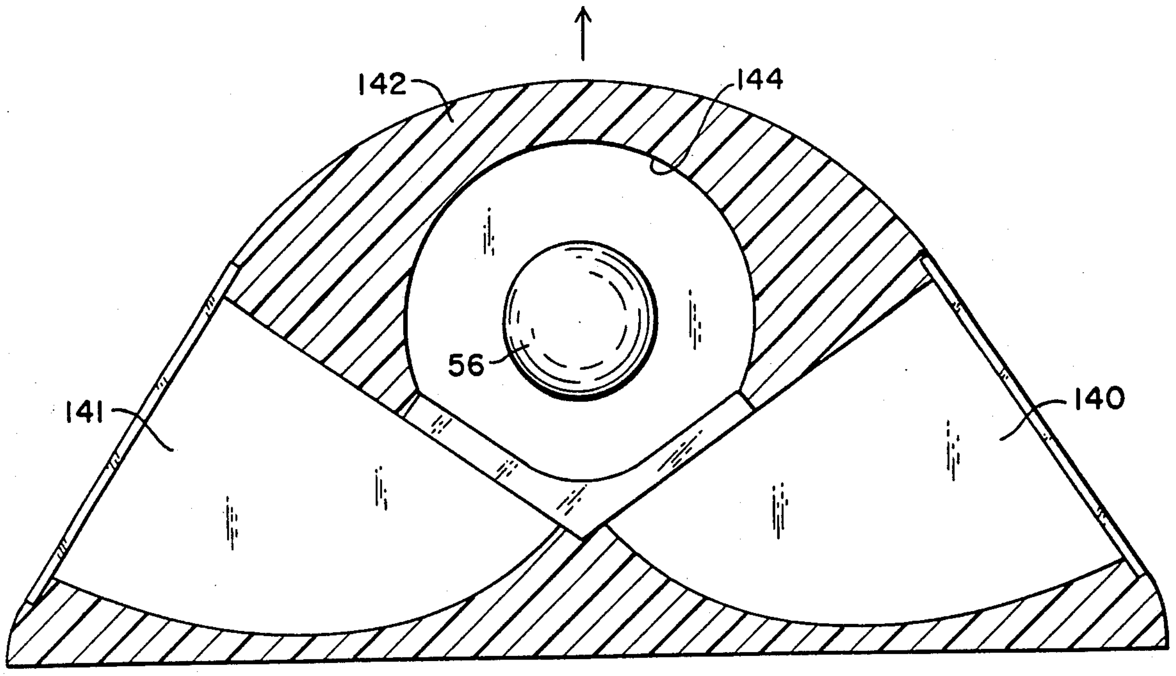
FIG. 26 is a horizontal sectional view of a combination navigational light ulilizing a pair of asymmetrical divergers and embodying both port and starboard running lights as provided in accordance with the invention.

A combination light providing both the port and starboard running lights for a vessel, but utilizing only a single light source, is shown in FIG. 26. In the embodiment illustrated, a pair of asymmetrical divergers 140 and 141 are mounted with their light entry planes adjacent one another and facing into a lamp receiving space or recess 144 in which a single lamp 56 is removably mounted. The lamp thus illuminates both divergers and the two divergers provide, respectively, a starboard running light (140) and a port running light (141). A housing 142 provides a mounting for the divergers, defines the lamp space 144, and comprises an all-weather enclosure for the diverger and the lamp.

Figure 27:
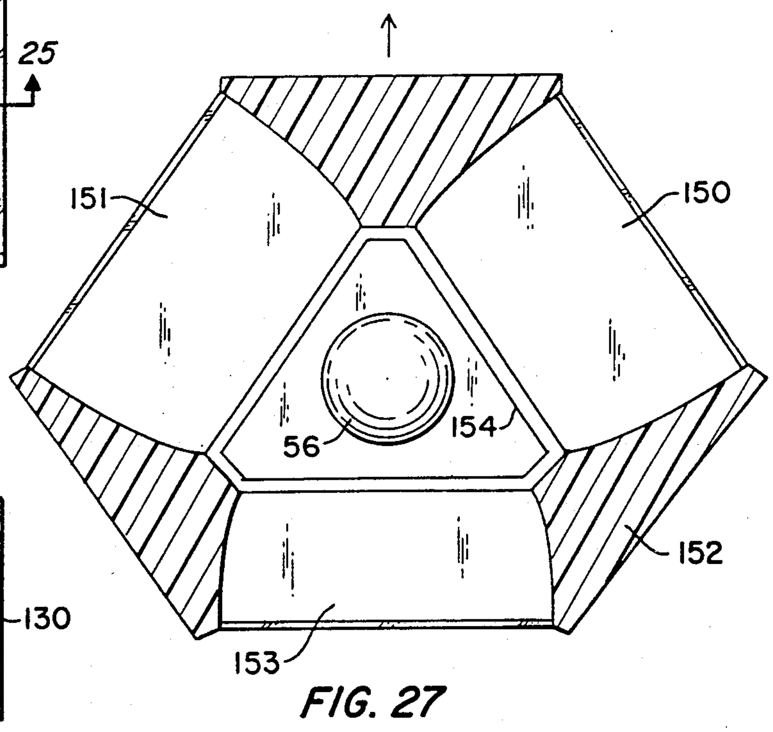
FIG. 27 is a plan view of a three-way combination light, utilizing three symmetrical divergers and providing port, starboard, and stern lights, all in accordance with the invention.

A combination light utilizing symmetrical divergers is illustrated in FIG. 27. In the embodiment shown, three divergers 150, 151, and 153 are employed to provide a three-way navigational light comprising a starboard running light (150), a port running light (151) and a stern light (153). A housing 152 defines a coated lamp receiving space or recess 154 for receiving a lamp 56, and mounts the three symmetrical divergers with their entry planes facing into and receiving light from the single source. This thus forms an excellent combination for mounting on the mast of a vessel. The Figure also shows how two symmetrical divergers may be utilized to provide port and starboard lights, simply by omission of the diverger 153 and substitution therefor of opaque housing material.

The invention thus provides a broad spectrum of extremely effective navigational lights, which are economical to purchase, use and maintain.

Since the design is not dependent upon a point or line source of luminous energy, and the lamp cavity is reflective and all of the light is effectively utilized, significant optical gain is achieved. The gain for a side light is dependent upon the configuration selected for the vertical arc of visibility and is as follows, ignoring reflection and transmission losses:

Parallel top and bottom: Gain of 3.5 times
Divergent top and bottom: Gain of 6.5 times
Vertical collimator (±30°): Gain of 9.5 times Conventional criteria apply to design of the housing for any particular application, including mounting on horizontal, inclined and vertical surfaces, on masts, etc. Combination lights, using a single lamp, are easily constructed using a common lamp receiving space.

For navigational lights, the cavity type divergers can be made of any marine metal or durable plastic, with a glass or plastic diffuser and cover lens. The specularly reflective surfaces may be of aluminum, silver, or other material having high specular reflectivity. The light diffusing surface may be formed by grinding, frosting, dimpling, and/or other similar techniques. The basic cavity comprised of top, bottom and side walls may be cast or molded in a single piece, or the sides, top and bottom may be separately formed and then secured together.

Dielectric divergers may be cast or molded of any durable transparent material such as glass or plastic, e.g., acrylic or polycarbonate. For the surfaces which require coating, any material having high specular reflectivity is suitable. Light diffusing surfaces may be formed the same as for the cavity divergers.

In view of the foregoing, it is now apparent that the present invention provides optical elements, and navigational lights embodying said elements, which are (1) in precise compliance with the 72 COLREGS and the implementing U.S. Statute; (2) capable of being manufactured in such small sizes as to be ideally suited to small vessels without need for elongated screens; (3) less costly than prior art lights in terms of both initial investments and cost of operation, especially in comparison to the lights purportedly designed to comply with the COLREGS; and (4) powered by an inexpensive and readily available light source.

And it is to be understood that the optical elements embodied in our invention are applicable to other lights, such as aircraft runway lights.

While certain preferred embodiments of the invention have been illustrated and described, it is to be understood that various changes, rearrangements and modifications may be made therein without departing from the scope of the invention as defined by the appended claims.

What is claimed is:

1. An optical element for navigational lights and the like, comprising an asymmetrical light diverger having a light entry plane for receiving diffuse light, a light exit plane positioned in spaced normal relation to said light entry plane, and at least one curved surface, which is in part parabolic, connecting said planes for diverging diffuse light from said light entry plane into a virtual line of luminous energy, the light from said line being transmitted through said light exit plane over a precise arc of visibility.

2. An optical element as set forth in claim 1, wherein said diverger comprises a first planar surface defining said light exit plane, a second planar surface extending from one edge of and normal to said first plane surface, said light entry plane being defined by the portion of said second planar surface remote from said first planar surface, and a curved surface joining the distal edges of said first and second planar surfaces, the portion of said curved surface adjacent said light entry plane comprising substantially an arc of a circle and the remainder of said curved surface being parabolic.

3. An optical element as set forth in claim 2, wherein said diverger comprises a block of light refractive dielectric material having external surfaces comprising said planar surfaces and said curved surface.

4. An optical element as set forth in claim 3, wherein the portion of the curved surface adjacent said light entry plane is coated with a specularly reflective material.

5. An optical element as set forth in claim 2, wherein said diverger comprises a reflective cavity defined by planar light diffusing means comprising said light entry plane, a planar wall joined with said diffusing means and comprising the remainder of said second planar surface, a transparent lens connected at one edge to said planar wall normal thereto and defining said first planar surface, and a curved wall having reflective interior surfaces connected to and joining the distal ends of said light diffusing means and said lens and comprising said curved surface.

* * * * *